United States Patent [19]

Hirai

[11] Patent Number: 5,168,298
[45] Date of Patent: Dec. 1, 1992

[54] AUTO FOCUS CAMERA

[75] Inventor: Isamu Hirai, Tokyo, Japan

[73] Assignee: Asahi Kogaku Kogyo Kabushiki Kaisha, Tokyo, Japan

[21] Appl. No.: 546,855

[22] Filed: Jul. 2, 1990

[30] Foreign Application Priority Data

Jul. 5, 1989 [JP] Japan .................. 1-173670

[51] Int. Cl.⁵ ............................................. G03B 13/36
[52] U.S. Cl. ...................................... 354/402; 354/403
[58] Field of Search ......................... 354/402, 403, 160

[56] References Cited

U.S. PATENT DOCUMENTS

| 4,284,335 | 8/1981 | Takemae et al. |
| 4,349,254 | 9/1982 | Jyojiki et al. |
| 4,352,545 | 10/1982 | Uno et al. |
| 4,534,636 | 8/1985 | Sugawara |
| 4,547,055 | 10/1985 | Ehrenfried |
| 4,564,277 | 1/1986 | Koch et al. ........................ 354/160 |
| 4,692,007 | 9/1987 | Vogt .................................. 354/160 |
| 4,763,147 | 8/1988 | Vogt .................................. 354/160 |
| 4,878,080 | 10/1989 | Takehana et al. ................. 354/403 |

FOREIGN PATENT DOCUMENTS

| 3401609 | 7/1984 | Fed. Rep. of Germany |
| 3433412 | 4/1985 | Fed. Rep. of Germany |
| 51-9821 | 1/1976 | Japan |
| 1-21284 | 6/1989 | Japan |
| 2222337 | 2/1990 | United Kingdom |

OTHER PUBLICATIONS

Patent Abstracts of Japan, P-802, Dec. 16, 1988, vol. 12, No. 483, JP-OS 63-197926.

Primary Examiner—Russell E. Adams
Attorney, Agent, or Firm—Sandler, Greenblum & Bernstein

[57] ABSTRACT

An autofocus camera having a plurality of object distance measuring zones and a photographing lens system. A distribution pattern of objects is deflected in the object distance measuring zones in accordance with object distances of the objects. An axial position of at least a part of the photographing lens system is adjusted in the optical axis direction to detect the position of the focal plane so that the focal plane can be varied. The adjusting of the axial position of at least a part of the lens system and the varying of the focal plane are driven in accordance with the distribution pattern of the objects so that the focal point of the photographing lens meets the objects.

24 Claims, 6 Drawing Sheets

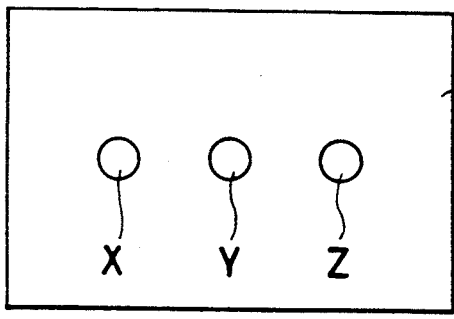
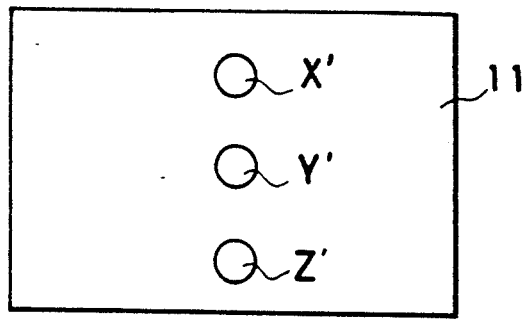
Fig. 1A          Fig. 1B
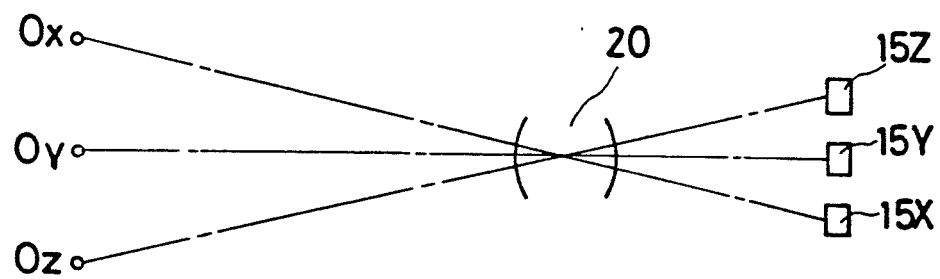
Fig. 3

Fig. 2A  Fig. 2B

OY=Dyf

| Ox | Oz | distribution pattern Z Y X | simplified figure of distribution pattern | Mark |
|---|---|---|---|---|
| f | f | O  O  O | —————— | N |
| f | n | O  O  O | / | T1 |
| n | f | O  O  O | \ | T2 |
| f | f | O  O  O | ⌒ | W1 |

*Fig.4A*

OY=Dyn

| Ox | Oz | distribution pattern Z Y X | simplified figure of distribution pattern | Mark |
|---|---|---|---|---|
| f | f | O  O  O | ⌣ | W2 |
| f | n | O  O  O | \ | T2 |
| n | f | O  O  O | / | T1 |
| n | n | O  O  O | —————— | N |

*Fig.4B*

AUTO FOCUS CAMERA

BACKGROUND OF THE INVENTION

1. Field of the Invention

The present invention relates to a multipoint object distance measurement auto focus camera having a plurality of object distance measuring zones.

2. Description of Related Art

An auto focus camera having a plurality of object distance measuring zones has been developed to prevent measuring light from passing between objects (e.g. two human figures) to be taken, so that an object distance can not be measured. Namely, if an object distance measuring zone is located only at the center of the picture plane, it is impossible to set a focal point on an object which is not in the center portion of the picture plane. To avoid this, a plurality of object distance measuring zones are provided, for example, on the center of the picture plane and the circumferential portions thereof, so that a focus is determined, based on an object which is located in one of the object distance measuring zones. The selection of the object distance measuring zones can be done in accordance with an algorithm of an associated camera or by a photographer's choice.

However, in a known multipoint object distance measurement auto focus camera, whichever object distance measuring zone is selected, a focus can be obtained only in one plane which is located at a specific distance from a film, provided that the depth of field is ignored. Namely, it is impossible to set a focal point on objects of different distances. In other words, in a conventional auto focus camera of the kind mentioned above, there is no concept in which a focal point is determined based on as many as possible object distance measuring zones.

SUMMARY OF THE INVENTION

The primary object of the present invention is to provide an auto focus camera having a plurality of object distance measuring zones, wherein a focal point is determined based on a plurality of objects located in the object distance measuring zones. Namely, the present invention is aimed to provide an auto focus camera in which even if the object distances of objects in the object distance measuring zones are different from one another, a focus can be determined in accordance with the different object distances.

The present invention is characterized in that a distribution pattern of the objects is detected in accordance with distance data from the different object distance measuring zones, so that the optical axial position of a photographing lens system or the angle of the optical axis can be adjusted in accordance with the distribution pattern of the objects.

To achieve the object mentioned above, according to the present invention, there is provided an auto focus camera having a plurality of object distance measuring zones and a photographing lens system, comprising a distribution pattern detecting means for detecting a pattern of distribution of objects in the object distance measuring zones in accordance with the object distances of the objects, a focusing means for adjusting an axial position of at least a part of the photographing lens system in the optical axis direction to change the position of the focal plane, and a focal plane varying means for varying the focal plane, the focusing means and the focal plane varying means being driven in accordance with the distribution pattern of the objects detected by the distribution pattern detecting means so that the focal point of the photographing lens meets the objects.

The focal plane varying means can be realized, for example, by:

① an adjusting means for adjusting an axial position of a specific lens of the photographing lens system in the optical axis direction to determine the curvature and direction of the focal plane;

② an image plane inclining means for adjusting the angle of the optical axis of the photographing lens with respect to the film plane to incline the image plane; or, ③ a film plane varying means for varying the position of the film plane.

It is also possible to combine two or three of the above described means.

The film plane varying means comprises an image plane inclining means for adjusting the angle of the optical axis of the photographing lens with respect to the film plane to incline the image plane.

According to the present invention, the focal point of the photographing lens system can meet, not only the object in a specific object distance measuring zone, but also the objects in a plurality of object distance measuring zones.

According to still another aspect of the present invention, there is provided an auto focus camera having a plurality of object distance measuring zones and a photographing lens system, comprising a distribution pattern detecting means for detecting whether a pattern of distribution of objects in the object distance measuring zones is parallel with or inclined relative to the film plane, in accordance with the object distance data of the objects, focusing means for adjusting an axial position of the whole photographing lens system in the optical axis direction when the distribution pattern is parallel with the film plane, and lens rotating means for rotating the photographing lens about an axis that is normal to the optical axis and parallel with the film plane and the distribution plane of the objects when the distribution pattern is inclined with respect to the film plane.

With this arrangement, the focal point of the photographing lens can be placed on the inclined object by rotating the photographing lens system in accordance with "Sheimpflug's law".

According to still another aspect of the present invention, there is provided an auto focus camera having a plurality of object distance measuring zones and a photographing lens system, comprising a distribution pattern detecting means for detecting whether a pattern of distribution of objects in the object distance measuring zones is parallel with the film plane or is a convex or concave shape, in accordance with the object distance data of the objects, focusing means for adjusting an axial position of the whole photographing lens system in the optical axis direction when the distribution pattern is parallel with the film plane, and means for moving a part of the photographing lens to produce a curvature of the field when the distribution pattern is concave or convex. Thus, the curvature of the field is produced for the curved object pattern.

BRIEF DESCRIPTION OF THE DRAWINGS

The invention will be described below in detail with reference to the accompanying drawings, in which;

FIG. 1A is a front elevational view of a picture plane showing a distribution of object distance measuring zones, according to an embodiment of the present invention;

FIG. 1B is a front elevational view of a picture plane showing another distribution of object distance measuring zones;

FIG. 2A is a schematic view of an object distance measuring device to be used in the present invention;

FIG. 2B is a schematic view of a reflected beam spot incident upon a PSD (position sensing device) shown in FIG. 2A;

FIG. 3 is a plan view showing an arrangement of an object distance measuring device corresponding to each object distance measuring zone;

FIGS. 4A and 4B are diagrams showing two distribution patterns of objects to be taken;

DESCRIPTION OF PREFERRED EMBODIMENTS

Figure 2C:
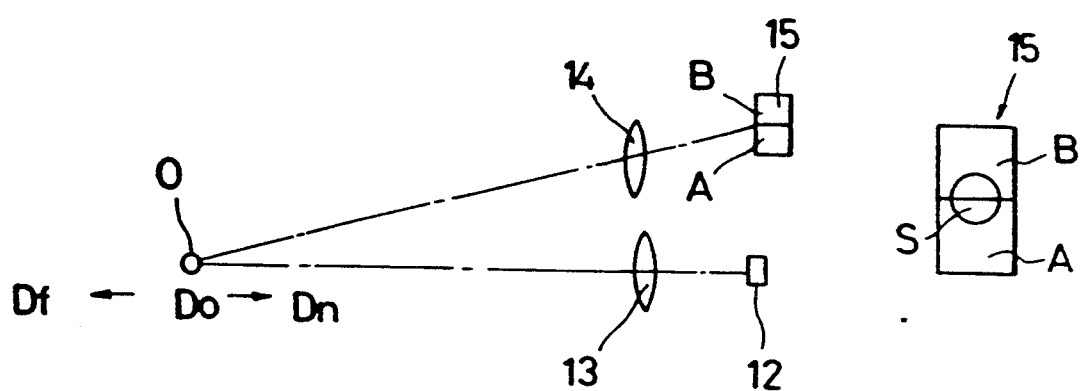
FIG. 2C is a schematic view of another type of object distance measuring device to be used in the present invention.
Figure 2C:
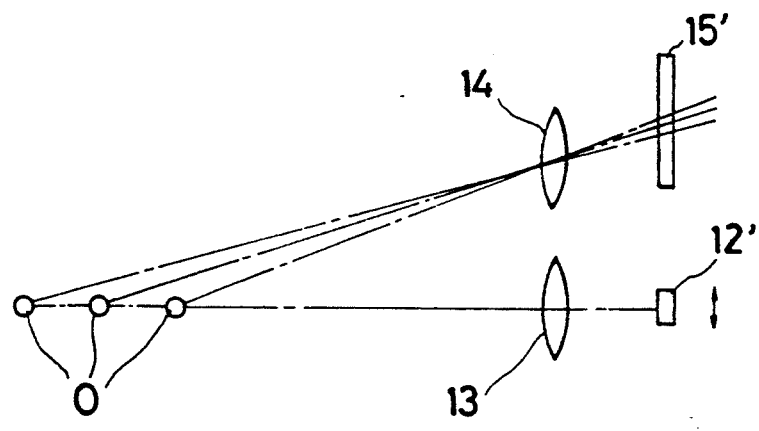

The following discussion will be directed to an embodiment in which there are three object distance measuring zones in a picture plane.

DETECTING MEANS OF OBJECT DISTRIBUTION PATTERN

Referring to FIG. 1A, there are three object distance measuring zones X, Y and Z in a rectangular picture plane 11 along the longer side of the rectangle. In particular left and right object distance measuring zones X and Z are located on opposite sides of center object distance measuring zone Y. A camera body has therein object distance measuring devices corresponding to the measuring zones X, Y and Z.

FIG. 1B shows another distribution wherein three object distance measuring zones X', Y' and Z' are arranged along shorter side of the rectangular picture plane. Namely, upper and lower object distance measuring zones X' and Z' are located on the opposite side of center object distance measuring zone Y'.

The object distance measuring devices are all of active the type, as shown in FIGS. 2A and 2B. The active type object distance measuring device shown in FIGS. 2A and 2B comprises a light emitter having an infrared light source (IRED) 12, a light emitting lens 13, and a light receiver having a light receiving lens 14 and two-divided type of light receiving element 15, which detects whether an object is far from (Df) or close to (Dn) the camera with respect to a reference object distance Do. The two-divided type of light receiving element 15 has two independent light receiving portions A and B adjacent to each other. When object O is located at the reference object distance Do, the light receiving portions A and B receive the same quantity of light (beam spot S) reflected by the object O. If the object O is located at a distance Df that is further from the camera than the reference distance Do, the quantity of light received by the light receiving portion A is larger than that of the light receiving portion B. Namely, $A > B$ (A, B=outputs, herein). Conversely, if the object O is located at a distance that is closer to the camera than reference distance Do, the quantity of light received by the light receiving portion B is larger than that of the light receiving portion A (i.e. $A < B$). For convenience's sake, when the object O is located at the reference distance Do, the distance Do is treated as being Df (i.e. $A = B$). Namely, When $A \geq B$, the object distance is Df; and,
When $A < B$, the object distance is Dn.

FIG. 3 shows three object distance measuring devices, viewed from above. In FIG. 3, three outputs are obtained from respective two-divided type light receiving elements 15X, 15Y and 15Z for three objects OX, OY and OZ in the measuring zones X, Y and Z, respectively.

Consequently, based on outputs AX and BX, AY and BY, and AZ and BZ of the light receiving portions A and B of the light receiving elements 15X, 15Y and 15Z, the object distances of the objects OX, OY and OZ can be judged as follows.

For the object OX;
$AX \geq BX \rightarrow DXf$ (object OX . . . far)
$AX < BX \rightarrow DXn$ (object OX . . . close).
For the object OY;
$AY \geq BY \rightarrow DYf$ (object OY . . . far)
$AY < BY \rightarrow DYn$ (object OY . . . close).
For the object OZ;
$AZ \geq BZ \rightarrow DZf$ (object OZ . . . far)
$AZ < BZ \rightarrow DZn$ (object OZ . . . close).

In accordance with the object distance data, a distribution pattern of the objects can be detected, as follows:

There are two cases which are classified in accordance with the object distance (far or close) of the object OY in the center measuring zone Y, as shown in FIGS. 4A and 4B.

In FIGS. 4A and 4B, "DISTRIBUTION PATTERN" represents the arrangement of the objects OX, OY and OZ as viewed from the camera side, "SIMPLIFIED FIGURE OF DISTRIBUTION PATTERN" shows a tendency of the distribution pattern shown by a straight line or a curved line. "MARK" discriminates the tendencies. That is, "N" (Normal) designates a planer object distribution pattern in parallel with the film plane, "T" (Tilt) an inclined object distribution pattern with respect to the film plane, and "W" (Curve) a convex or concave object distribution pattern, respectively. "T1" and "T2" have opposite inclination directions. "W1" and "W2" have opposite curvatures (convex and concave).

As can be seen from FIGS. 4A and 4B, in the illustrated embodiment, there are three types (N, T, W) and five classes (N, T1, T2, W1, W2) of distribution patterns of the objects.

FOCAL PLANE VARYING MEANS

Figure 5A:
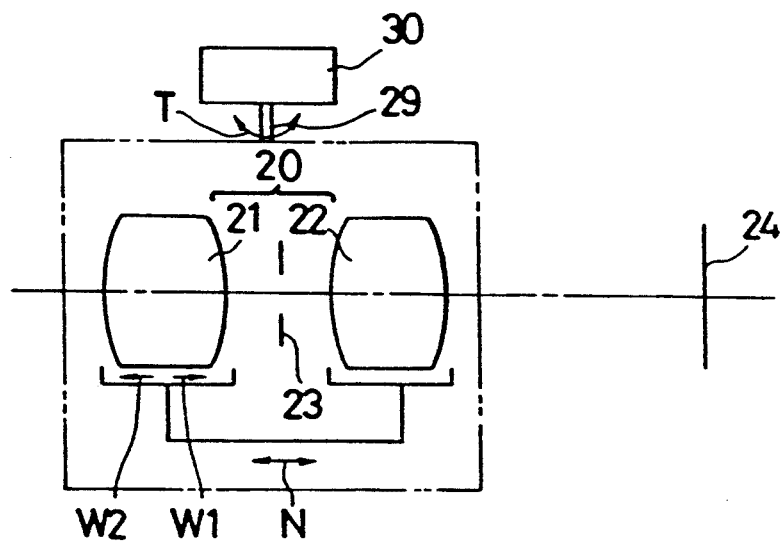
FIG. 5A is a schematic side elevational view of one type of photographing lens system used in the present invention.

① With respect to the distribution patterns of N-type and W-type:

FIG. 5A schematically shows a photographing lens system for the N-type and W-type distribution patterns. In FIG. 5A, the photographing lens system 20 comprises a first lens group 21 and a second lens group 22. Numeral 23 designates a diaphragm, and 24 a film plane.

The focus can be adjusted for all of the objects having the N-type distribution pattern by moving the first lens group 21 and the second lens group 22 together in the optical axis direction of the photographing lens system 20, as is well known.

On the other hand, if only the first lens group 21 is moved relative to the second lens group 22, a so-called curvature of the field produces. It is known that a focal point can be adjusted within a wider range for the W-type distribution pattern by utilizing the curvature of the field (e.g. Japanese Unexamined Patent Publication No. 51-9821). For the W1 group of distribution pattern, the first lens group 21 should be moved in a direction to come closer to the second lens group 22. For the W2 group of distribution pattern, the first lens group 21 should be moved in a direction away from the second lens group.

The mechanism for moving the first lens group 21 and the second lens group 22 together in accordance with the object distance data is per se known. Similarly, the mechanism for moving only the first lens group 21 relative to the second lens group in accordance with the distribution pattern data is also per se known.

(2) With respect to the T-type distribution pattern:

For the T-type distribution pattern, it is possible to set a focal point by inclining the optical axis of the photographing lens system 20 relative to the film plane 24 in accordance with "Sheimpflug's law".

Figure 7:
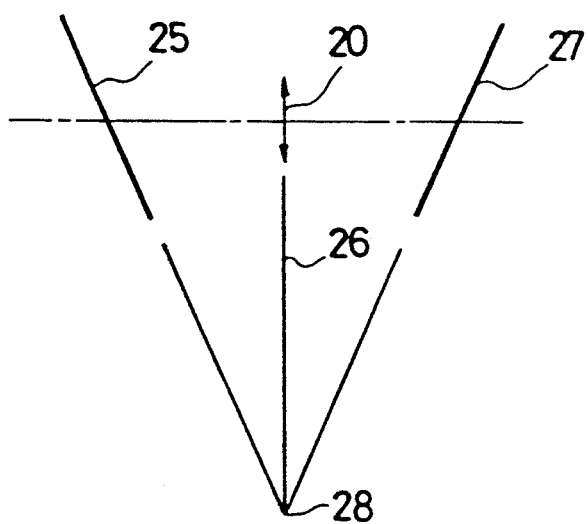
FIG. 7 is an explanatory view showing the principle of "Sheimpflug's law"

According to "Sheimpflug's law", as shown in FIG. 7, when extensions of the object plane 25, the plane 26 normal to the optical axis of the photographing lens system 20 and the image plane 27 intersect at one point (one line) 28, all the objects on the object plane 25 are exactly focused on the image plane 27 (i.e. the film plane 24).

Figure 5B:
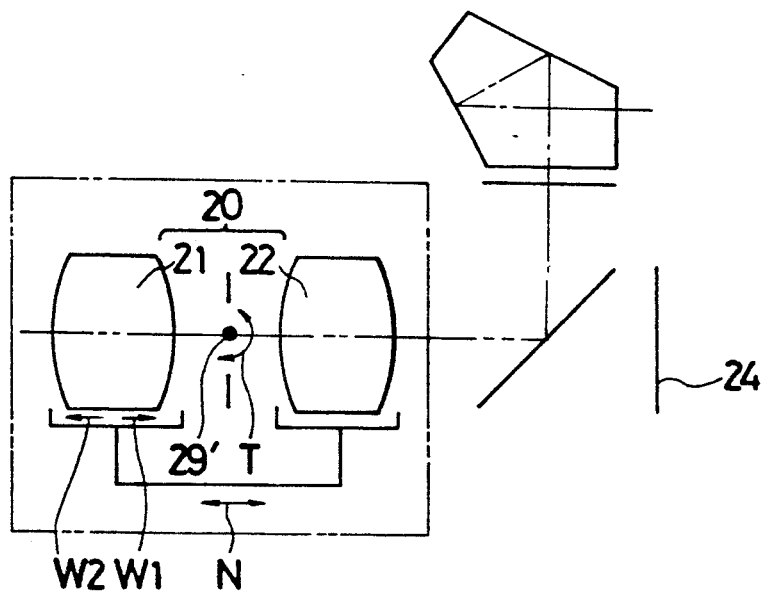
FIG. 5B is a schematic side elevational view of another type of photographing lens system used in the present invention.
Figure 6:
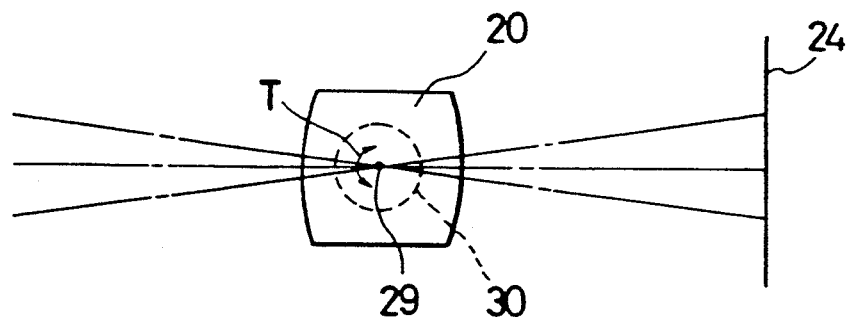
FIG. 6 is a plan view of FIG. 5A, showing an inclination of the optical axis of the photographing lens system with respect to a film plane.

Due to this optical principle, focusing can be exactly set for the objects OX, OY and OZ by rotating the photographing lens system 20 which is supported so as to rotate about the vertical axis 29 (which is normal to the optical axis and parallel with the film plane and the object distribution plane) in the forward and reverse directions by a rotating actuator 30 in accordance with the patterns T1 and T2, as shown in FIGS. 5 and 6. The rotating actuator 30 can be easily realized, for example, by an electromagnetic actuator.

If the three object distance measuring zones X', Y' and Z' are arranged in vertical direction, as shown in FIG. 1B, the rotating axis 29' of the photographing lens system 20 should be a horizontal axis as shown in FIG. 5B. The horizontal axis 29' is normal to the optical axis and parallel with the film plane and the object distribution plane.

Alternatively, it is possible to make the focal plane varying means of a mechanical film plane varying means for mechanically varying the position of the film plane.

Figure 8:
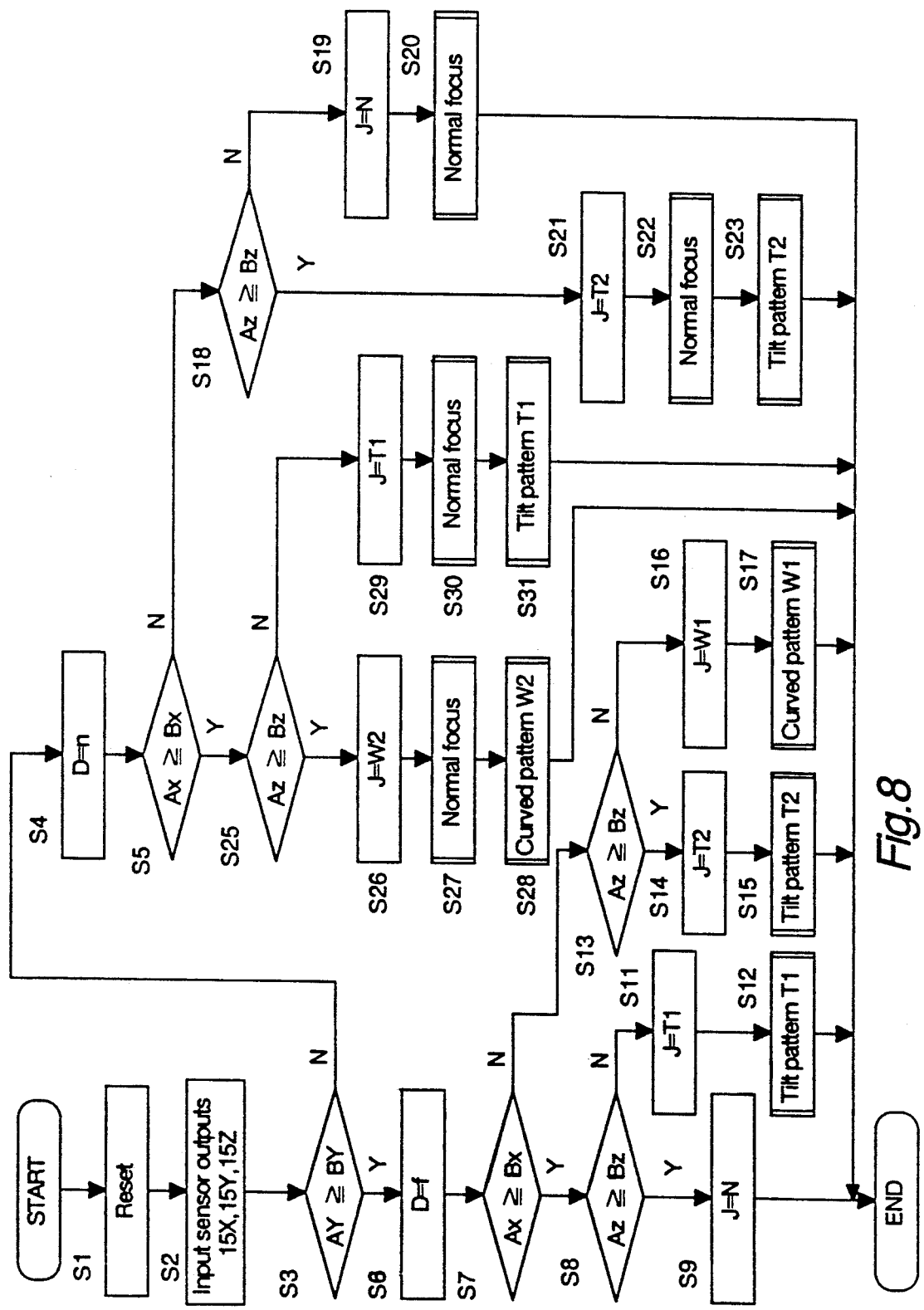
FIG. 8 is a flow chart of an auto focusing operatin of the present invention.

FIG. 8 shows a flow chart of the above mentioned operations. In FIG. 8, the photographing lens system 20 is set at a infinite photographing position when the shutter is pushed by one step. Thereafter, the outputs of the two-divided type light receiving elements 15X, 15Y and 15Z are input (steps S1 and S2). At step S3, the object distance of the object OY in the center object distance measuring zone Y is checked. If the distance is "close", the object distance D is set to be a close distance (n) at step S4. Thereafter, control proceeds to step S5. If the object distance is "far" at step S3, the object distance D is set to be a far distance (f) at step S6. Then, at step S7, the object distance of the object OX in the object distance measuring zone X is examined. If the object distance of the object OX is "far", control proceeds to step S8 at which the object distance of the object OZ in the other object distance measuring zone Z is examined. If the object distance of the object OZ is "far", the N-type pattern is set (step S9).

At step S8, if the object distance of the object OZ is determined to be "close", the T1 group distribution pattern is set to perform the sub-routine (steps S11 and S12). The sub-routine of the T1 group distribution pattern (and T2 group distribution pattern) is performed, for example, by the rotation of the photographing lens system 20 about the vertical axis 29 in the clockwise and anti-clockwise directions.

If the object distance of the object OX in the measuring zone X is "close" at step S7, the object distance of the object OZ in the measuring zone Z is examined at step S13. If the object distance of the object OZ is "far", a sub-routine of the T2 group of distribution pattern is carried out at steps S14 and S15. If the object distance of the object OZ is "close", a sub-routine of the W1 group distribution pattern is carried out at steps S16 and S17. The sub-routine of the W1 pattern (and W2 pattern) is performed, for example, by the movement of the first lens group 21.

At step S3, if the object distance of the object OY is "close", the object distance of the object OX in the measuring zone X is examined at step S5. If the object distance of the object OX is "close", the object distance of the object OZ in the measuring zone Z is examined at step S18. If the object distance of the object OZ is "close", a sub-routine of the N-type pattern is carried out to feed the photographing lens system 20 forward at steps S19 and S20. At step S18, if the object distance of the object OZ is determined to be "far", the T2 pattern is detected at step S21. Thereafter, the sub-routine of the N-type pattern is performed at step S22, and the sub-routine of the T2 group distribution pattern is performed at S23. The sub-routine of the N-type pattern is performed, for example, by the movement of the photographing lens system 20 as a whole.

If the object distance of the object OX in the measuring zone X is determined to be "far" at step S5, the object distance of the object OZ in the measuring zone Z is examined at step S25. If the object distance of the object OZ is "far", the W2-type pattern is set, so that after the normal sub-routine for movement towards the close distance side is performed, the sub-routine of W2-type is performed (steps S26~S28).

If the object distance of the object OZ in the measuring zone Z is determined to be "close" at step S25, the T1-type pattern is set, so that after the normal sub-routine for the movement toward the close distance side is carried out, the sub-routine of the T1-type is performed (steps S29~S31).

In the above mentioned embodiment, although the T-type pattern and the W-type pattern independently exist, only for clarification, it is possible to process a T-type pattern which is a composite pattern of the T-type and the W-type. Namely, to perform the sub-routine of the T-type pattern, it is possible to move the first lens group 21 of the photographing lens system 20 and to rotate the photographing lens system 20 about the vertical axis 29 by the rotating actuator 30 at one time.

Although the determination of the object distance is effected in accordance with two choices of "far" and "close" in the above mentioned embodiment, it is possible to determine the object distance in with more than three choices. In such an alternative, the distribution pattern is classified into more finely divided groups. It is also possible to divide the object distance measuring zone into more than three zones. In accordance with the detected distribution pattern, the movement of the photographing lens system 20 (N-type), the movement of the first lens group 21 in the opposite directions (W-type), the rotational movement of the photographing lens 20 about the vertical axis 29 in the opposite directions (T-type), and the displacement of these movements are generally controlled to exactly set a focus to be located on the objects in the measuring zones at one time.

It should be noted that the object distance measuring device is not limited to the above mentioned type. FIG. 2C shows another active type object distance measuring device. An object distance measuring light emitted from the light source 12' scans an object 0 through light emitting lens 13, and position sensing device (PSD) 15' receives a light reflected from the object through a light receiving element. The object distance is obtained by the output of the PSD 15'. Furthermore, the object distance measuring device is not limited to an active type, as mentioned above in which measuring light is emitted toward the objects. For example, the present invention can be performed with a so-called passive type of object distance measuring device which detects the object distance from the light passed through the photographing lens.

I claim:

1. An auto focus camera having a plurality of object distance measuring zones and a photographing lens system, comprising:
    distribution pattern detecting means for detecting a pattern of distribution of objects in said object distance measuring zones in accordance with the distances of said objects;
    focusing means for adjusting an axial position of at least a part of said photographing lens system in the optical axis direction to change a focal plane position; and,
    means for varying said focal plane,
    said focusing means and said focal plane varying means being driven in accordance with said distribution pattern of said objects detected by said distribution pattern detecting means so that a focal point of said photographing lens can be determined in accordance with said objects.

2. An auto focus camera according to claim 1, wherein said focal plane varying means comprises means for adjusting a curvature of a field so as to adjust an axial position of a specific lens of said photographing lens system in the optical axis direction to determine a curvature and direction of said focal plane.

3. An auto focus camera according to claim 1, wherein said focal plane varying means comprises an image plane inclining means for adjusting an angle of the optical axis of said photographing lens with respect to a film plane to incline an image plane.

4. An auto focus camera according to claim 1, wherein said focal plane varying means comprises a film plane varying means for varying a position of a film plane.

5. An auto focus camera according to claim 2, wherein said focal plane varying means comprises an image plane inclining means for adjusting an angle of the optical axis of said photographing lens with respect to a film plane to incline an image plane.

6. An auto focus camera according to claim 3, wherein said focal plane varying means comprises a film plane varying means for varying a position of said film plane.

7. An auto focus camera according to claim 1, wherein said object distance measuring zones has at least three zones, consisting of a center zone and right and left zones located on opposite sides of said center zone.

8. An auto focus camera according to claim 7, wherein said distribution pattern of said objects is detected in accordance with said object distances of said objects in said right and left zones, in comparison with a reference object distance which is said object distance of said object in said center zone.

9. An auto focus camera according to claim 8, wherein said distribution pattern includes:
    a normal pattern in which all objects of said measuring zones are deemed to be substantially identical to each other;
    a tilt pattern in which said object distance of said object of one of said right and left zones is deemed to be substantially identical to said object distance of said object in said center zone, said object distance of said object of said other right or left zone being different from said object distance of said object in said center zone; and
    a curved pattern in which said object distances of said object distance of said object of said center zone and both objects of said right and left zones are located on a same side with respect to said object of said center zone.

10. An auto focus camera according to claim 9, wherein said photographing lens system is wholly moved in the optical axis direction when said distribution pattern is a normal pattern.

11. An auto focus camera according to claim 9, wherein said photographing lens system is supported to wholly rotate about a rotation axis normal to the optical axis and parallel with a film plane and said distribution plane of said objects.

12. An auto focus camera according to claim 11, wherein said photographing lens system is rotated about a rotation axis when said distribution pattern comprises a tilt pattern.

13. An auto focus camera according to claim 9, wherein said photographing lens system comprises a lens group which is independently movable in the optical axis direction so as to produce a curvature of a field, independently of the axial movement of said photographing lens system.

14. An auto focus camera according to claim 13, wherein a partial lens group is moved when said distribution pattern comprises a curved pattern.

15. An auto focus camera according to claim 1, wherein said object distance measuring zones have at least three zones consisting of a center zone and upper and lower zones located on opposite sides of said center zone.

16. An auto focus camera having a plurality of object distance measuring zones and a photographing lens system, comprising:
    distribution pattern detecting means for detecting a pattern of distribution of objects in said object distance measuring zones in accordance with object distance data of said objects;

focusing means for adjusting an axial position of said photographing lens system in the optical axis direction;

means for adjusting an axial position of a part of said photographing lens to determine a value and direction of curvature of a field; and, means for rotating said photographing lens about an axis normal to the optical axis and parallel with a film plane and a distribution plane of said objects;

wherein at least one of said focusing means, adjusting means and lens rotating means is driven in accordance with said distribution pattern of said objects detected by said distribution pattern detecting means.

17. An auto focus camera according to claim 16, wherein said distribution pattern includes:

a normal pattern in which all of said objects of said measuring zones are deemed to be substantially identical to each other;

a tilt pattern in which said object distance of said object of one of said right and left zones is deemed to be substantially identical to said object distance of said object in said center zone, and said object distance of said object of said right or left zone is different from said object distance of said object in said center zone; and, a curved pattern in which said object distances of said objects of said right and left zones are different from said object distance of said object of said center zone and both objects of said right and left zones are located on a same side with respect to said object of said center zone.

18. An auto focus camera according to claim 16, wherein said photographing lens system is moved by said focusing means when said distribution pattern is a normal pattern.

19. An auto focus camera according to claim 16, wherein said photographing lens system is moved by said lens rotating means when said distribution pattern is a tilt pattern.

20. An auto focus camera according to claim 16, wherein said photographing lens system is moved by said adjusting means when said distribution pattern is a curved pattern.

21. An auto focus camera according to claim 16, wherein said distribution pattern includes:

a normal pattern in which all objects of said measuring zones are deemed to be substantially identical to each other;

a tilt pattern in which said object distance of said object of one of said upper and lower zones is deemed to be substantially identical to said object distance of said object in said center zone, and said object distance of said object of said upper or lower zone is different from said object distance of said object in said center zone; and, a curved pattern in which said object distances of said objects of said upper and lower zones are different from said object distance of said object of said center zone and both objects of said upper and lower zones are located on a same side with respect to said object of said center zone.

22. An auto focus camera having a plurality of object distance measuring zones and a photographing lens system, comprising:

distribution pattern detecting means for detecting whether a pattern of distribution of objects in said object distance measuring zones is parallel with or inclined relative to film plane, in accordance with object distance data of said objects;

focusing means for adjusting an axial position of said photographing lens system in the optical axis direction when said distribution pattern is parallel with said film plane; and, lens rotating means for rotating said photographing lens about an axis normal to the optical axis and parallel with said film plane and a distribution plane of said objects when said distribution pattern is inclined with respect to said film plane.

23. An auto focus camera having a plurality of object distance measuring zones and a photographing lens system, comprising:

distribution pattern detecting means for detecting whether a pattern of distribution of objects in said object distance measuring zones is parallel with a film plane or is convex or concave, in accordance with object distance data of said objects;

focusing means for adjusting an axial position of said photographing lens system in the optical axis direction when said distribution pattern is parallel with a film plane; and means for moving a portion of said photographing lens to produce a curvature of a field when said distribution pattern is concave or convex.

24. An auto focus camera having a plurality of object distance measuring zones, comprising:

means for detecting a distribution pattern of objects in said object distance measuring zones in accordance with distance data of said objects, said distribution pattern including:

a normal pattern in which all objects of said measuring zones are deemed to be substantially identical to each other;

a tilt pattern in which an object distance of said object of one of an upper object distance measuring zone and a lower object distance measuring zone is deemed to be substantially identical to an object distance of said object in a center object distance measuring zone, and said object distance of said object of said other upper or lower object distance measuring zones is different from said object distance of said object in said center object distance measuring zone; and, a curved pattern in which said object distances of said objects of said upper or lower object distance measuring zones are different from said object distance of said object of said center object distance measuring zone and both objects of said upper and lower object distance measuring zones are located on a same side with respect to said object of said center object distance measuring zone.

* * * * *